(12) United States Patent
Wagner et al.

(10) Patent No.: US 7,086,592 B2
(45) Date of Patent: *Aug. 8, 2006

(54) METHOD AND SYSTEM FOR DISPOSING OF DISCARDED ITEMS

(75) Inventors: Frederico Wagner, Sao Paulo SP (BR); Geraldo Luiz Yoshizawa, Sao Paulo SP (BR); Fabio Zsigmond, Valinhos SP (BR)

(73) Assignee: Ikan Technologies Inc., Riverside, CT (US)

( * ) Notice: Subject to any disclaimer, the term of this patent is extended or adjusted under 35 U.S.C. 154(b) by 278 days.

This patent is subject to a terminal disclaimer.

(21) Appl. No.: 10/684,328

(22) Filed: Oct. 13, 2003

(65) Prior Publication Data

US 2004/0112960 A1 Jun. 17, 2004

Related U.S. Application Data

(63) Continuation of application No. 09/929,817, filed on Aug. 14, 2001, now Pat. No. 6,663,004.

(51) Int. Cl.
*G06F 19/00* (2006.01)

(52) U.S. Cl. .................................. 235/385; 235/462.01
(58) Field of Classification Search ................. 235/385
See application file for complete search history.

(56) References Cited

U.S. PATENT DOCUMENTS

| 4,636,950 A | 1/1987 | Caswell et al. |
| 5,478,989 A | 12/1995 | Shepley |
| 5,532,928 A | 7/1996 | Stanczyk et al. |

(Continued)

OTHER PUBLICATIONS

International Search Report; International Appln. No. PCT/IB04/01076; May 25, 2005.

(Continued)

*Primary Examiner*—Steven S. Paik
(74) *Attorney, Agent, or Firm*—Knobbe, Martens, Olson & Bear LLP

(57) ABSTRACT

An electronic trash disposal unit comprises a control unit which scans and identifies disposed items to store them in an appropriate recycling bin. The unit is connectable to a communication network which updates a central database with the contents of each unit. The unit initiates a reorder instruction to suppliers.

42 Claims, 3 Drawing Sheets

U.S. PATENT DOCUMENTS

| | | |
|---|---|---|
| 5,699,525 A | 12/1997 | Embutsu et al. |
| 5,712,989 A | 1/1998 | Johnson et al. |
| 5,841,115 A | 11/1998 | Shepley |
| 5,914,472 A * | 6/1999 | Foladare et al. ............ 235/380 |
| 5,960,402 A | 9/1999 | Embutsu et al. |
| 5,965,858 A | 10/1999 | Suzuki et al. |
| 5,979,240 A * | 11/1999 | Rix et al. ..................... 73/602 |
| 6,024,281 A | 2/2000 | Shepley |
| 6,047,843 A * | 4/2000 | Mecke .................... 220/23.88 |
| 6,131,744 A * | 10/2000 | Pratt ........................... 209/540 |
| 6,378,721 B1 * | 4/2002 | Williams ............... 220/495.08 |
| 6,386,386 B1 * | 5/2002 | George ...................... 220/526 |
| 6,425,487 B1 * | 7/2002 | Emmott et al. ............. 209/703 |
| 6,530,518 B1 | 3/2003 | Kirchilsky et al. |
| 2002/0016731 A1 | 2/2002 | Kupersmit |
| 2002/0059175 A1 | 5/2002 | Nanano |
| 2002/0120502 A1 | 8/2002 | Sakaguchi |

OTHER PUBLICATIONS

PCT International Search Report dated Feb. 14, 2003.
Article: Dietitian/Healthy Eating Services "Transforming How Dietitions Offer Advice"; AirClic ; 2001-2003.
Article: Shop Smart, Eat Right "Healthier, More Nutritious Meals"; Beeline Shopper; 2001-2003.
Article: Shop Smart, Eat Right—Sample Grocery List "Guide Yourself to Healthier Eating"; Beeline Shopper; 2001-2002.
Article: Shop Smart, Eat Right—Sample Recipes "Great Meals Made Easy"; Beeline Shopper; 2001-2002.

* cited by examiner

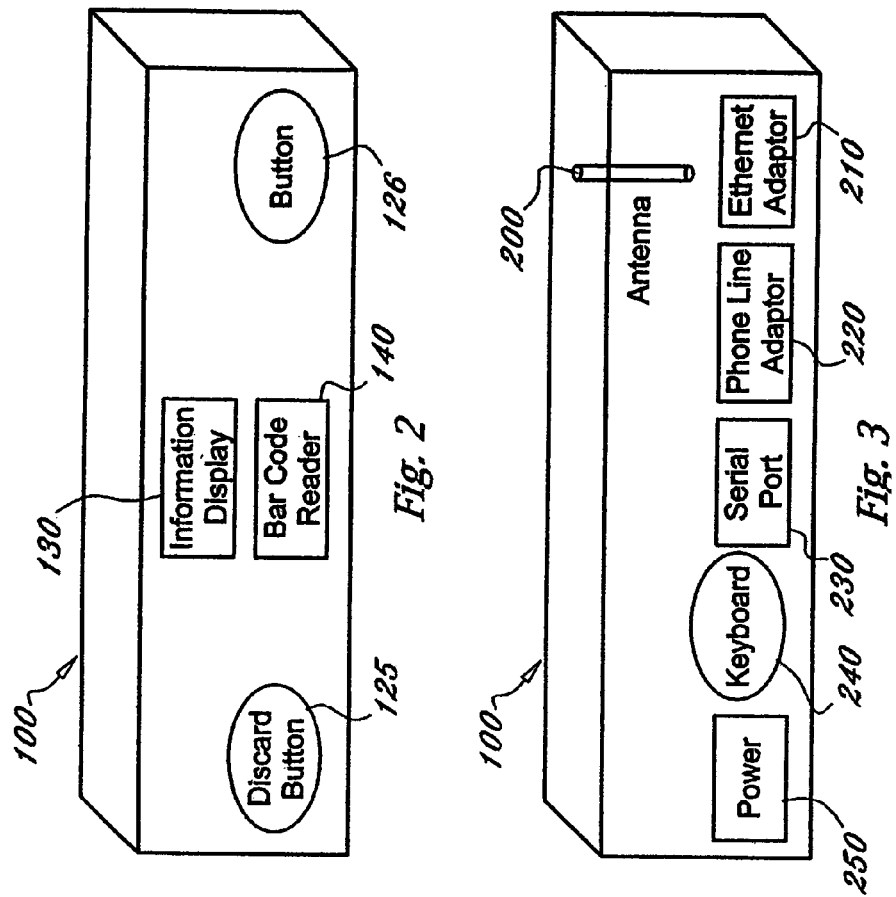
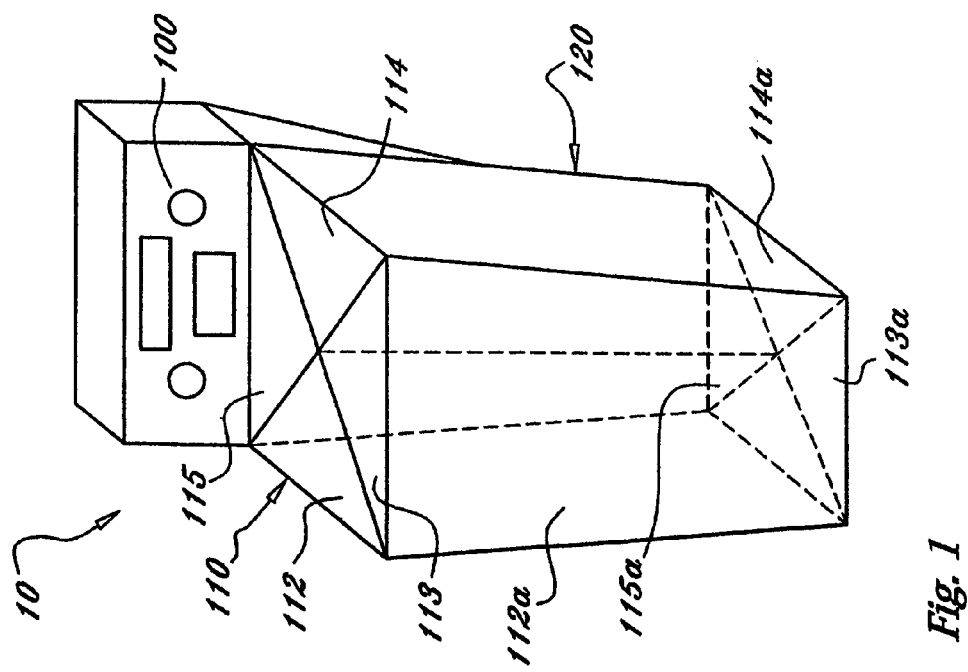
Fig. 2
Fig. 3
Fig. 1

METHOD AND SYSTEM FOR DISPOSING OF DISCARDED ITEMS

CROSS-REFERENCE TO RELATED APPLICATION

This is a continuation application of U.S. patent application Ser. No. 09/929,817, filed Aug. 14, 2001, now U.S. Pat. No. 6,663,004.

STATEMENT REGARDING FEDERALLY SPONSORED RESEARCH OR DEVELOPMENT n/a

1. Field of the Invention

The present invention relates to a trash disposal system and method, and in particular, to an electronic trash disposal system and method which automatically facilitates the reordering and recycling of disposed items.

2. Background of the Invention

Disposal of trash has been an issue humans have had to deal with since the beginning of civilization. Often when trash became a problem, people would simply cover over the trash with dirt and build on top of the rubble. Countless plagues have been associated with improper refuse disposal and, although modern technology has helped society deal with waste disposal, the challenge remains to handle discarded items efficiently and safely.

Because of the world's expanding population, the age-old solution of burying trash is becoming less attractive for many reasons including limited space and contamination of the environment, to name a few. In an effort to help alleviate some of the problems associated with discards, recycling has been gaining in popularity. Although recycling helps both by reducing the overall amount of trash and by making more efficient use of natural resources, it generally requires more processing including separating different kinds of recyclable articles from the general refuse. Consumers often regard the extra effort and/or cost associated with recycling less than favorably.

Another consideration of modern trash disposal is that when an item is discarded, it often needs to be replaced. Generally, this requires a human operator to take action to ensure that the required item is replaced.

A trash disposal system is needed which can track the disposal of items and automatically reorder required items that have been discarded as well as help alleviate some of the perceived shortcomings of recycling.

SUMMARY OF THE INVENTION

An embodiment of the present invention provides an electronic discard unit which includes a central processing unit (CPU), an identification database accessible by the CPU, a content database accessible by the CPU, at least one input device coupled to the CPU. The CPU executes programmatic software to perform functions including:
 1. using the at least one input device to obtain a code corresponding to a discarded item;
 2. identifying the discarded item by referring to the identification database;
 3. updating the content database to include an entry corresponding to the identified discarded item; and
 4. generating a re-order instruction for replacing the discarded item.

Another embodiment of the present invention provides a trash receiving unit which includes a holding container and a computer operably coupled to the holding container. The computer has a central processing unit, at least one user operable input device and a content database which is accessible by the computer. The computer is operable to execute programmatic software instructions to perform the functions of:
 1. updating the content database with information regarding a trash item stored the holding container;
 2. receiving input from at least one user operable input device, the received input includes an instruction to reorder the trash item; and
 3. generating a re-order instruction corresponding to the trash item in the holding container.

Yet another embodiment of the present invention provides an electronic trash system which includes one or more electronic discard units. Each unit includes a central processing unit (CPU), an identification database accessible by the CPU, a content database accessible by the CPU and at least one input device coupled to the CPU. The CPU executes programmatic software that perform functions including:
 1. using at least one input device to obtain a code corresponding to a discarded item;
 2. identifying the discarded item by referring to the identification database;
 3. updating the content database to include an entry corresponding to the identified discarded item; and
 4. generating a re-order instruction for replacing the discarded item.

The system also includes a central database and a communication networked that couples one or more of the electronic discard units to the central database.

Yet a further embodiment of the present invention provides an electronically activated disposal unit which includes a storage container having an opening, an input device operatively coupled to the opening for identifying a discarded item passing through the opening and a computer operatively coupled to the input device. The computer executes a program that performs the functions of:
 1. receiving a code corresponding to the discarded item from the input device;
 2. identifying the discarded item based on the code;
 3. updating a content database with information corresponding to the discarded item; and
 4. generating a re-order instruction for a selected discarded item.

A further embodiment of the present invention provides a trash disposal system which includes a storage container, a means for identifying an item placed in the storage container, a means for separating identified items according to one or more recycling rules; and a means for re-ordering the identified discarded item.

Another embodiment of the present invention provides a method of disposing of an item using an electronic trash unit which has a storage bin includes scanning the item for a machine readable code. The machine readable code is stored in an electronic storage medium. A re-order instruction is generated for the item based on the machine readable code. The item is stored in the storage bin, and a content database is updated with information regarding the item.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a perspective drawing of an electronic trash unit according to an embodiment of the invention;

FIG. 2 is a front view of the control panel shown in FIG. 1;

FIG. 3 is a rear view of the back of the control panel shown in FIG. 2;

DETAILED DESCRIPTION OF THE INVENTION

Figure 4:
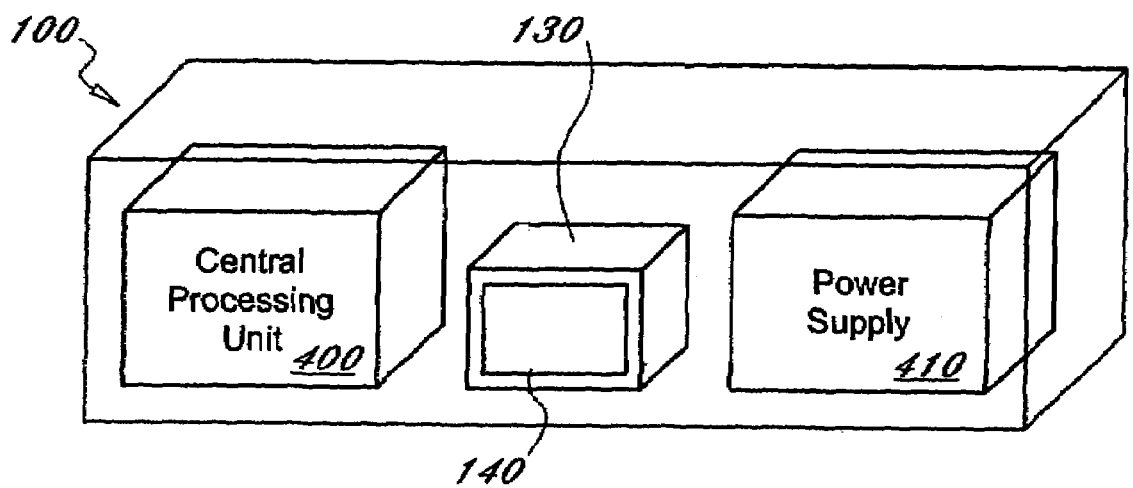
FIG. 4 is a view of the internal components of the control panel according to an embodiment of the invention.

Referring to FIG. 1, an electronic trash (e-trash) unit is shown generally as 10 and includes a storage area 120, a controllable lid 110 which is moveably connected to cover the storage area 120 and a control panel 100 which is positioned on top of the controllable lid 110. Storage area 120 can take the form of any suitable shape (i.e., cylindrical, rectangular, square, etc.). In the embodiment shown, trash is deposited in the proper container using gravity. As illustrated, the controllable lid 110 contains four separate openings 112, 113, 114 and 115 and four separate storage bins 112a, 113a, 114a and 115a which correspond to the openings, respectively. In the closed position, these openings work together to provide a temporary holding shelf where a trash item to be discarded (not shown) may be placed. The trash item to be discarded is placed so that a scanning device 140 located on the control panel 100 can electronically read a code such as a bar code located on the trash item. The trash item is identified and the proper opening is activated allowing the trash item placed on the controllable lid 110 to fall into the proper storage bin (112a, 113a, 114a and 115a) in storage area 120. The storage bins (112a, 113a, 114a and 115a) as well as the storage area 120 may be constructed of metal and fabricated using known methods of construction, or may be constructed out of a polymer or composite material. Each of the storage bins (112a, 113a, 114a and 115a) may contain a removable liner (not shown) to facilitate emptying of the unit 10. The liner may be disposable and remain with the discarded trash or it may be a reusable liner that may be emptied into a larger depository and returned to the unit 10. The liners may be made in different colors to indicate the kind of recyclables present therein. It should be apparent to those skilled in the art that other means of sorting and storing trash would be suitable and are considered to be within the scope of this disclosure such as using a conveyor belt system to transport the trash items identified in the manner disclosed above to the storage area 120. Also, although four openings are shown (112, 113, 114 and 115), more or fewer openings may be utilized without departing from the spirit of the present invention.

The control panel 100 is described with reference to FIGS. 2–4. As shown, the control panel 100 is arranged to provide an easy to operate user interface for the e-trash unit 10. The control panel 100 includes an information display 130 which displays information about the trash item discarded in accordance with the present invention. Examples of the kind of information displayable include detailed descriptions about the item, cost to replace the item, title of the item, identification code, product advertisement, as well as other information that might be useful to the user. The displayed information may be customized to suit the individual needs of the user. The displayable information may be stored in a database that resides within the unit 10 or may be accessed from a remote database using a communication network such as the Internet.

Although the display 130 is depicted as a visual display, it is within the scope of this disclosure to use any suitable means to communicate the desired information to the user such as a speech synthesis output device.

In an embodiment of the invention, a discard button 125 is used to initiate the control command that scans the trash item. Other methods could be used such as a pressure activated switch located on the controllable lid 110 that automatically starts the process when the trash item is placed thereon. Other user functions may be incorporated as needed and are representatively illustrated as button 126. Button 126 may be a software programable button which is user configured to customize the unit 10 or it may be a function specific input such as an over-ride switch. A bar code scanner 140 is positioned to scan the trash item placed on the controllable lid 110 to identify the item using a machine scan-able code affixed thereon. The code may be affixed from the manufacturer or it may be applied by the user of the present invention. Other electronic means of item identification may be used such as optical laser scanners or magnetically encoded labels as is known in the art to identify the trash item and are included in this disclosure.

The control unit 100 may also have a variety of interface components as needed by particular applications. In an embodiment, the control unit 100 includes a keyboard port 240, a serial port 230 a phone line adaptor 220 and a network adaptor such as an Ethernet adaptor 210. A keyboard (not shown) may be used to enter alphanumeric information into the control unit 100 such as item codes or discard instructions. The serial port 230 may be used to connect a variety of external peripherals such as but not limited to personal digital assistant (PDA), printers, backup drives, etc. Such devices are known in the art and the present invention allows users to utilize appropriate technology to interface with the control unit 100 to best suit the need of the user. For example, a tape backup drive can be plugged in to the serial port 230 to make a nightly backup of the day's activity of the unit 10 or a user might connect a PDA to the control unit 100 using the appropriate interface (i.e. serial port 230 or network adaptor 210, etc.) for downloading the contents of the unit 10 into the PDA. Other configurations are possible depending on the particular needs of the user and may include universal serial bus (USB) ports, pointing device inputs among other input/output interfaces as are known in the art. In addition to standard telephone inputs such as the phone line adaptor 220, a wireless communication link may be used to communicate with a communications network (i.e. the Internet) using an antenna 200. The antenna 200 may also be placed inside the control unit 100. A power button 250 is provided to control power to the electronics included in the control unit 100.

Internal to the control unit 100 is a CPU 400, associated memory and other components which allow the CPU 400 to operate as a computer as is known in the art. The CPU 400 controls the function of the scanner 140, the display 130 and the controllable lid 110. The CPU may be permanently connected to a communications network or may initiate a connection as needed. The connectivity of the unit 10 will be discussed in more detail below.

Figure 5:
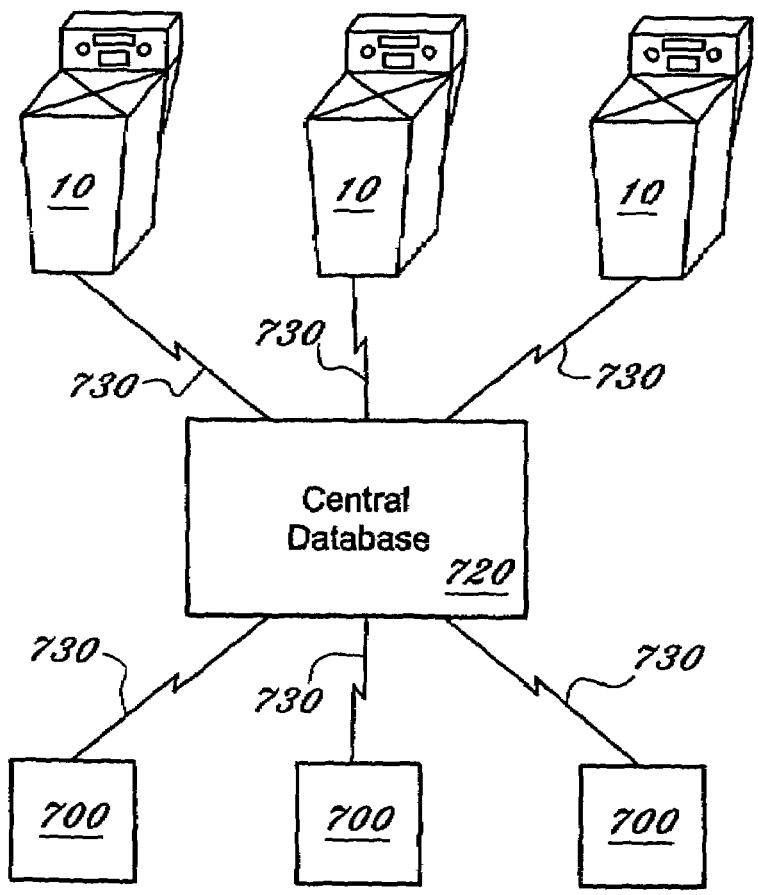
FIG. 5 is a block diagram of an electronic trash network according to an embodiment of the invention.

Now referring to FIGS. 2, 3 and 5, a communication network 730 such as the Internet is used to provide connectivity of each unit 10 with a central database 720 that keeps track of the disposed contents in each unit 10. The communication network 730 may be accessed using the network adaptor 210 or by connecting the control unit 100 to a modem (not shown) using the phone line adaptor 220 or through a wireless connection using an internal modem (not shown) coupled to the antenna 200 as is known in the art. Permanent "always on" connections such as digital subscriber line (DSL), T1, satellite links, cable hookups, dial-up modems plugged into a phone line or networked connections such as local or wide area networks (LAN or WAN) may be utilized to provide the needed connectivity. Suppliers, market researchers, recycling companies and other interested parties 700 also connect using the communication network 730 to access information contained in the central database 720. Each e-trash unit 10 sends its information which includes the type and amount of trash stored in each bin (112a, 113a, 114a and 115a). Either the user or a third party contractor 700 may be notified when it is time to empty the bins by a message being transmitted from the central database 720 using the communication network 730 or the user may be notified of the need to empty the bins by a notification message appearing on the information display 130 located on the control unit 100. Other methods of notification, such as an indicator light (not shown) mounted on the control unit 100 or on the controllable lid 110 can be used. In the embodiment which relies on notification from the central database 720 to inform the interested party (either the user or third party contractor such as a recycling company) of the need to empty the bin, a communication (such as an e-mail, telephone or data message) may be sent back to the CPU 400 in the control unit 100. The information may be displayed on the information display 130. The choice of the method used to deliver emptying instructions may be selected by the user to best suit the application.

In operation, the trash item is temporarily placed on the controllable lid 110 so that the bar code reader 140 can scan the item for an identification code. Most products today have a scanable code affixed thereon but the process for dealing with code-less and unrecognizable items is discussed below. The bar code reader 140 identifies the discarded item by referring to an identification database (not shown) which is accessible by the CPU 400. The identification database can physically reside within the e-trash unit 10 or it may be accessible by the CPU 400 through the communication network 730. A user presses the discard button 125 to initiate the process of scanning and identifying the item. Once the item is identified, the relevant information is displayed on display 130 such as a description, title, reorder code or price of the replacement. If the user wishes to reorder the item being discarded, an order is initiated in accordance to predefined ordering instructions. The reordering process can take place automatically, that is whenever a recognized item is disposed using the unit 10, the CPU generates and transmits a reorder instruction to a selected supplier. In this way, reordering is automatically accomplished using the present invention.

In another embodiment, the user is given the opportunity to confirm the desire to reorder the discarded item. The user's choice may be inputted into the control unit 100 using any suitable input method such as pressing the "soft button" 126 when instructed to do so by an instruction displayed on the information display 130, pressing a key on a keyboard (not shown) or by speaking if a voice recognition input is implemented as is known in the art. In one embodiment, the unit 10 transmits information regarding a discarded item being disposed of in a unit 10 to a central reordering site such as a purchasing officer's workstation (not shown) and allows the reordering decisions to be centralized rather than individually made at the local unit 10 level. Once an identification is made, the proper storage bin (112a, 113a, 114a or 115a) is selected to store the item. The proper bin opening (112, 113, 114 or 115) is opened and the item falls into the selected storage bin. The central database 720 is informed of the location of the trash item. The proper storage bin is selected according to recycling guidelines which can be customized depending on the geographic location of the user and the recycling options available. Examples include of a simple recycling scheme would include separating the trash into glass, plastic, metal and all else. A more elaborate scheme may be used to suit the individual needs of the user such as separating different color glass or different kinds of plastic, etc.

Some items like discarded organic or packing materials are not identifiable by the unit 10 and the user may simply wish to discard them without identifying or reordering. They may be simply discarded using a bypass means such as by pressing the "soft button" 126 if the button is so programmed. Of course any other input means to indicate the discard choice would be acceptable as discussed above. Non-recyclable items may be stored in an appropriate bin. Items that are recyclable but not reordered are still identified so as to be placed in the proper bin and to update the central database 720 with the contents of the unit 10.

The initial programming of the unit 10 is provided by the manufacturer of the unit 10. The manufacturer may offer different options such a providing a unit 10 that only has a wireless interface for connecting with the communication network 730 or may provide a "standard" unit 10 that includes most of the common options with the user using the unit 10 in a way that makes sense in the context of the user's application. Another embodiment includes a user programmable unit 10 that may be customized by the user. It is anticipated that an operating system would be built into the CPU 400 along with a user specific program interface that would allow the user to select various options from a menu presented. In another embodiment, a large user of the present invention could specify the functionality desired and the manufacturer would program the specific requirements into the individual units 10. Some units 10 could be programmed to meet different needs (i.e. some units 10 may have a voice recognition input while others use a keyboard) and yet communicate and work together over the communication network 730 to perform the required functions as a whole.

Figure 6:
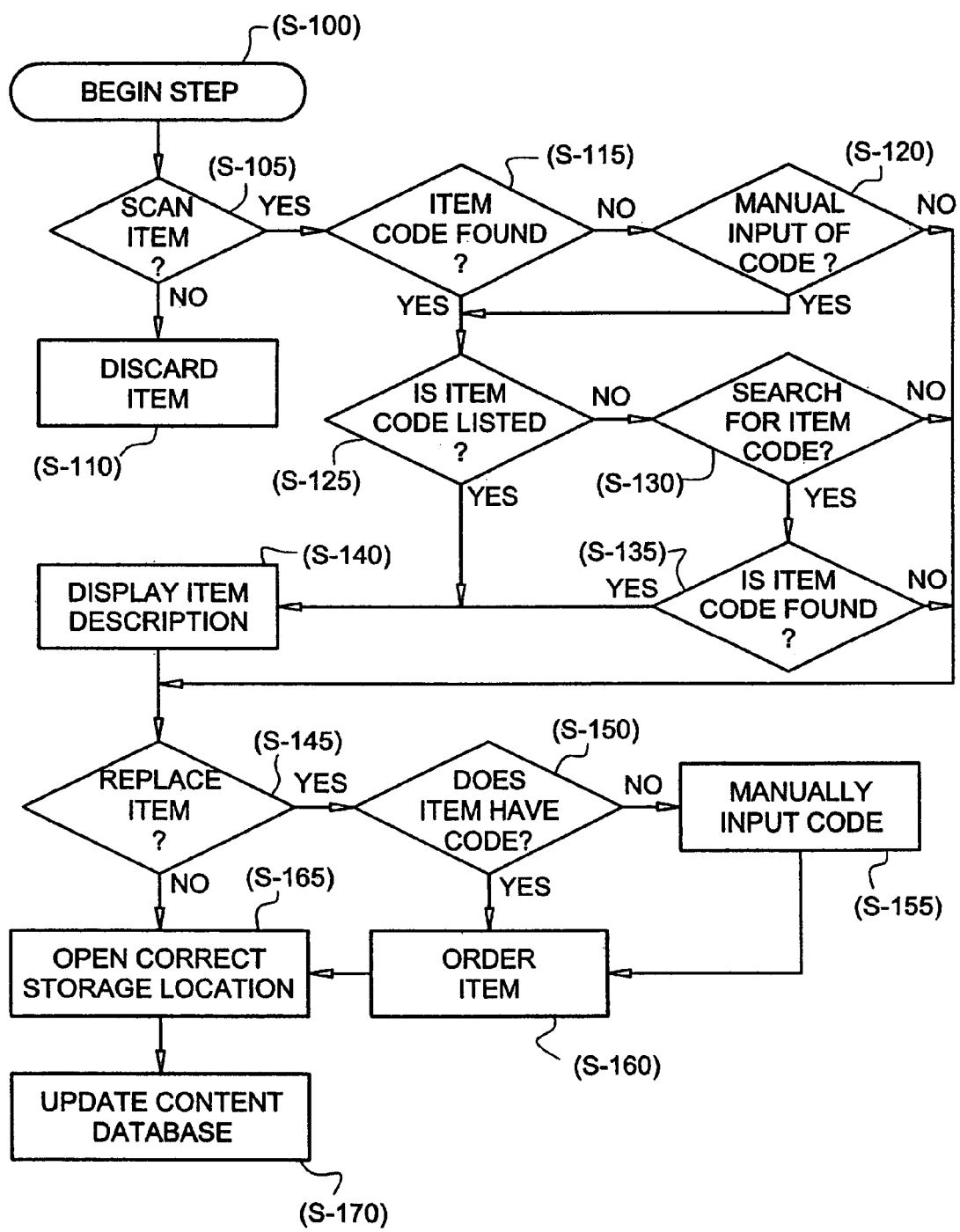
FIG. 6 is a flow chart of a detailed process of disposing of trash according to an embodiment of the invention.

A method of the use an apparatus of one or units 10 is described with reference to FIG. 6, a flow chart of the method of disposing of trash according to the present invention. Initially, a trash item is placed on controllable lid 110 (step S-100). The user is presented with a bypass (step S-105) to deal with the case of unidentifiable or non-scannable items. Items selected for bypass are simply discarded (step S-110). Items so discarded are placed in a general storage bin. If the bypass (step S-105) is not selected, the item is scanned to see if a code is detectable (step S-115). If no code is found, the user is given an opportunity to manually input a code (step S-120). If the item code is located (step S-115) or manually inputted (step S-120), the code may be manually inputted using a suitable input device such as voice recognition or keyboard as discussed above), the code is compared using an identification database (step S-125). If a matching code is found in the database, information such as title, price to replace or reordering code, etc. is displayed on the display 140 (step S-140) allowing the user to decide whether or not to replace and reorder the item (step S-145). If no matching code is found (step S-125), the unit may optionally search using the communication network 730 (step S-130) and, if found, the information is displayed as discussed above. If no code is located (step S-135), the user is still given the opportunity to reorder the item (step S-145), however, no information will be displayed and a code will have to be manually entered if not previously done (steps S-150 and S-155). A reorder instruction is generated and transmitted to the proper supplier (step S-160). The reorder instruction is generated by the CPU 400 according to the programming provided and customized by the user as discussed above. The reorder instruction may be printed out and sent by mail to a supplier may be transmitted electronically to the supplier. Next, the proper bin opening (112, 113, 114 or 115) is selected (step S-165) and the content database is updated to keep a record of the items stored therein (step S-170). As discussed above, the proper bin is selected by referring to the local recycling rules programmed into the CPU 400 or by the generic rules programmed by the manufacturer.

Users of the e-trash units 10 may customize each unit to meet specific needs of the user. Examples of the preferences users may specify include reordering periods such as weekly, monthly or when the total value of the reorder equals or exceeds a certain level. Other customizable preferences include which supplier or suppliers to use which may be further customized by best price, specific supplier for a specific consumable, method of payments such as credit card, billing, check etc., which recycling company or companies to use, etc. Because the e-trash units 10 are customizable, the user experiences great flexibility when implementing the present invention. The user benefits by using the e-trash units 10 by allowing automated replacement of consumables and automated separation of recyclable materials. Because the use of e-trash units 10 reorders consumables as specified by the user, inventories may be reduced leading to enhanced productivity on the part of the user. If the e-trash units 10 are used in a home setting, the user spends less time in the supermarket since a list of used consumables is constantly available. The "grocery list" can be generated by the e-trash unit 10. Additionally, because of the ease and automated handling of recyclables, the user may be able to benefit financially from the resale of the recycling materials sorted by the unit 10. Also, all of the system and transaction information, such as reordering period, reordering levels, suppliers, billing information, order history, order status, user account information, recycling options, credits and the like, can be made available to users over the Internet.

The role of the central database 720 in the function of the e-trash units 10 is to store detailed lists of the contents of each unit 10 linked to the database 720. Additionally, the central database 720 stores the user preferences discussed above such as how often to reorder, who to reorder from, the best price to pay, etc. Also, the central database functions to authorize credit transactions between users, suppliers and other third parties such as recycling and market research companies. The central database may also send confirmations of orders or emptying instructions as discussed above. These instructions and confirmations can be sent by e-mail, "regular mail" or fax. Another role of the central database 720 is that of statistic gatherer enabling the user to better anticipate their future needs and trends.

Suppliers who participate in the present invention benefit by receiving automatic reorders which enhances customer loyalty. Credit may be preauthorized reducing the risk of write-offs. Suppliers also benefit by the statistical data generated by the central database 720 which allows the supplier to reduce the inventory required to meet the customer's needs. Written confirmations of orders are sent by the central database 720 providing a written contract to facilitate good business relations.

Participating recycling companies benefit by having a steady source of separated recyclables without having to deal with intermediaries which drives up the cost. Credits for materials received from users can be credited through the central database 10, thereby streamlining operations. Additionally, many users will wish to contract with the recycling companies directly to empty the units 10 automatically, thereby increasing revenues for the recycling companies.

Other third parties such as marketing research companies benefit by having a detailed list of the disposed items in each unit 10. This will allow research into ways to decrease supplier and user waste and to study consumer behavior. Additionally, research may be done on ways to develop more environmental packaging, especially in regard to high volume items as identified by the present invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An electronic discard system comprising:
   a central processing unit (CPU);
   at least one user input device coupled to the CPU;
   a scanning device; and
   program software which, when executed by the CPU, performs functions including:
      reading a user bypass instruction via the user input device, and at least partly in response, accepting a first discarded item without scanning the first discarded item;
      reading a user specified order period from an account database;
      reading information scanned from a second discarded item by the scanning device; and
      generating a re-order instruction for replacing the second discarded item at least partly in response to the user specified order period and the information scanned from the second discarded item.

2. The electronic discard system as defined in claim 1, further comprising an identification database, wherein information corresponding to items is accessed over a network from the identification database using information scanned by the scanning device as a locator.

3. The electronic discard system as defined in claim 1, further comprising an information display coupled to the CPU, wherein the information display is used to display identification information retrieved from a remote identification database.

4. The electronic discard system as defined in claim 1, wherein the CPU executes programmatic software to accept a manually entered code for at least one discarded item instead using information scanned from the at least one discarded item.

5. The electronic discard system as defined in claim 1, further comprising a display device that displays a user notification to empty at least a first container.

6. The electronic discard system as defined in claim 1, further comprising a user specified supplier preference stored in the account database.

7. A discard processing system, comprising:
a holding container;
a computer;
a content database accessible by the computer, the content database including information on items discarded into the holding container; and
a second database that stores user specified preferences, the second database accessible by the computer;
the computer being operable to execute programmatic software instructions to perform the functions of:
receiving input from the at least one user operable input device, the received input including an instruction to reorder a discarded item;
reading a user specified order period from the second database;
reading a user specified supplier preference from the second database;
generating a re-order instruction corresponding to the discarded item in the holding container and providing the re-order instruction to a first supplier at least partly in response to the user specified order period and the user specified supplier preference.

8. The discard processing system as defined in claim 7, further comprising a scanning device coupled to the computer, the scanning device configured to scan codes from discarded items.

9. The discard processing system as defined in claim 7, further comprising an identification database, wherein information corresponding to discarded items is located in the database based on codes associated with the discarded items.

10. The discard processing system as defined in claim 7, further comprising:
a scanning apparatus coupled to the computer; and
a bypass input coupled to the computer, wherein activation of the bypass input by a user will enable items to be discarded into the holding container without being successfully scanned by the scanning apparatus.

11. A trash receiving system comprising:
a holding apparatus;
a computer coupled to the holding apparatus;
a content database accessible by the computer;
a second database that stores user specified preferences accessible by the computer;
an identification database accessible by the computer; and
a display accessible by the computer;
the computer being operable to execute programmatic software instructions to perform the functions of:
offering a user the option to bypass scanning of a first discard item;
scanning the first discard item;
searching for a code on the first discard item;
in response to failing to find the code, receiving a manually input code;
in response to finding the code, locating corresponding first discard item information, including at least title and price, from the identification database;
displaying the title and price on the display.

12. The trash receiving system as defined in claim 11, wherein the identification database is accessed over a network.

13. The trash receiving system as defined in claim 11, wherein the identification database is stored locally.

14. The trash receiving system as defined in claim 11, further comprising a barcode scanner coupled to the computer, wherein the barcode scanner scans items being discarded.

15. An electronic disposal unit, comprising:
a storage container;
an input device operatively configured to identify an item being discarded;
a computer coupled to the input device;
a display device; and
a computer program executable by the computer, the computer program performing the functions of:
receiving a code corresponding to the discarded item from the input device;
retrieving information from a database that identifies the discarded item based at least in part on the code;
displaying the information retrieved from the database on the display device;
reading user specified preference information, including information on when a re-order is to be placed;
generating a re-order instruction for the discarded item at least partly in response to the user specified preference information.

16. The electronic disposal unit as defined in claim 15, further comprising a color coded trash bag corresponding to a type of recyclable.

17. The electronic disposal unit as defined in claim 15, wherein the input device is configured to read a magnetically encoded label.

18. The electronic disposal unit as defined in claim 15, wherein the input device is a barcode scanner.

19. The electronic disposal unit as defined in claim 15, further comprising an interface that can be coupled to a personal digital assistant, wherein the electronic disposal unit is configured to transfer via the interface information with respect to the electronic disposal unit content to a personal digital assistant.

20. The electronic disposal unit as defined in claim 15, further comprising a wireless communication link coupled to an antenna and used to communicate with a communications network.

21. The electronic disposal unit as defined in claim 15, further comprising a networked database that stores information on the electronic disposal unit content.

22. The electronic disposal unit as defined in claim 15, wherein the display device displays a user notification to empty the electronic disposal unit.

23. The electronic disposal unit as defined in claim 15, wherein a recycling entity is instructed of the need to empty the disposal unit.

24. The electronic disposal unit as defined in claim 15, wherein the user specified preference information specifies that a reorder is to be placed when the value of the reorder reaches at least a first amount.

25. The electronic disposal unit as defined in claim 15, wherein the user specified preference information specifies that a reorder is to be placed at specified time intervals.

26. The electronic disposal unit as defined in claim 15, wherein the user specified preference information specifies a supplier preference.

27. An electronic discard unit comprising:
a processing unit;
an identification database accessible by the processing unit;
a content database accessible by the processing unit;
at least one input device coupled to the processing unit;

the processing unit executing programmatic software to perform functions including:

using the at least one input device to obtain a code corresponding to a discarded item;

identifying the discarded item by referring to the identification database, and if a match is not found within the identification database, by searching over a computer network for a match;

updating the content database to include an entry corresponding to the identified discarded item;

generating a re-order instruction for replacing the discarded item; and a sensor that, at least partly in response to detecting the discarded item, causes the identification of the discarded item.

28. The electronic discard unit according to claim 27, further comprising:

a storage chamber for storing a discarded item therein; and a controller, the controller coupled to the processing unit and controlling access to the storage chamber.

29. The electronic discard unit according to claim 27, further comprising a network adaptor electrically coupling the processing unit to a communication network.

30. The electronic discard unit according to claim 27, wherein the processing unit executes programmatic software to further perform the function of transmitting the re-order instruction to a supplier over a communication network.

31. The electronic discard unit according to claim 27, wherein the processing unit executes programmatic software to further perform the function of confirming to a user of the electronic discard unit that a re-order instruction was processed.

32. The electronic discard unit as defined in claim 27 further comprising:

a user operated bypass control which causes at least one discarded item to be deposited in storage bin without reference to the at least one discarded item identification code;

a stored user preference readable by the processing unit that includes a preference related to shopping delivery timing and identifying a preferred supplier;

a closure mechanism that supports the discarded item while the at least one input device obtains the code corresponding to the discarded item and that opens after the at least one input device obtains the code; and a display, wherein the processing unit executes programmatic software to perform the function of displaying a price of the discarded item on the display.

33. The electronic discard unit as defined in claim 27 as defined in claim 27, further comprising a user operated bypass control which causes at least one discarded item to be deposited in a first storage bin receptacle without reference to the at least one discarded item identification code.

34. The electronic discard unit as defined in claim 27, further comprising a stored user preference readable by the processing unit which includes a value related to shopping delivery timing.

35. The electronic discard unit as defined in claim 27, further comprising a stored user preference readable by the processing unit which includes data identifying a preferred supplier.

36. The electronic discard unit as defined in claim 27, further comprising a closure mechanism that supports the discarded item while the at least one input device obtains the code corresponding to the discarded item and that opens after the at least one input device obtains the code.

37. The electronic discard unit as defined in claim 27, further comprising:

a display; and software that performs the function of displaying a price of the discarded item.

38. A method of processing a disposed of item using an electronic trash unit having a storage bin comprising:

sensing the presence of an item being disposed of;

initiating the scanning of the item at least partly in response to the sensed presence;

scanning the item for a machine readable code;

storing the machine readable code in an electronic storage medium;

reading user preference data, including selection criteria for determining to which entity a re-order is to be placed;

selecting the entity to whom the order is to be placed based at least in part on the selection criteria;

generating a re-order instruction for the item based on the machine readable code and on user preference data;

storing the item in the storage bin; and updating a content database with information regarding the item.

39. The method as defined in claim 38, further comprising:

determining a price for the item; and displaying the price on a display mounted on the electronic trash unit.

40. The method as defined in claim 38, further comprising:

scanning a second item for a second machine readable code;

determining that the second machine readable code is unavailable;

informing a user of the unavailability of the second machine readable code; and receiving a code corresponding to the second item from the user.

41. The method as defined in claim 38, further comprising attempting to identify the first item by referring to a local database, and if the attempted identification fails, attempting to identify the first item by searching over a computer network.

42. The method as defined in claim 38, wherein the selection criteria includes price.

* * * * *